United States Patent
Cai et al.

(10) Patent No.: US 11,838,577 B2
(45) Date of Patent: Dec. 5, 2023

(54) AUDIO AND VIDEO TRANSMISSION SYSTEM

(71) Applicant: REALTEK SEMICONDUCTOR CORPORATION, Hsinchu (TW)

(72) Inventors: Yakun Cai, Suzhou (CN); Dafei Li, Suzhou (CN); Hong Chang, Suzhou (CN)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 17/406,011

(22) Filed: Aug. 18, 2021

(65) Prior Publication Data
US 2022/0321948 A1   Oct. 6, 2022

(30) Foreign Application Priority Data
Apr. 2, 2021 (CN) .......................... 202110362756.0

(51) Int. Cl.
*H04N 21/43* (2011.01)
*G06F 13/42* (2006.01)
*H04N 21/4363* (2011.01)

(52) U.S. Cl.
CPC ... *H04N 21/43632* (2013.01); *G06F 13/4282* (2013.01); *G06F 2213/0042* (2013.01)

(58) Field of Classification Search
CPC .......... H04N 21/43632; G06F 13/4282; G06F 2213/0042
See application file for complete search history.

(56) References Cited

U.S. PATENT DOCUMENTS

| 10,152,447 | B2 | 12/2018 | Lai | |
|---|---|---|---|---|
| 2009/0300243 | A1* | 12/2009 | Chao | G06F 3/14 710/71 |
| 2015/0046945 | A1* | 2/2015 | Zhang | H04N 21/4222 725/37 |
| 2017/0139871 | A1* | 5/2017 | Yeh | G06F 13/4022 |
| 2017/0161226 | A1* | 6/2017 | Gerber | G06F 13/385 |
| 2018/0009666 | A1* | 1/2018 | Hundal | C04B 35/524 |
| 2018/0181177 | A1* | 6/2018 | Fukute | G06F 1/266 |
| 2019/0064899 | A1* | 2/2019 | Doi | G06F 9/4411 |
| 2019/0073329 | A1* | 3/2019 | Tao | G06F 13/4282 |

(Continued)

FOREIGN PATENT DOCUMENTS

TW    202041038 A    11/2020

OTHER PUBLICATIONS

English abstract translation of TW202041038A.

*Primary Examiner* — Henry Tsai
*Assistant Examiner* — Harry Z Wang
(74) *Attorney, Agent, or Firm* — WPAT, P.C., INTELLECTUAL PROPERTY ATTORNEYS; Anthony King

(57) ABSTRACT

An audio and video transmission system includes a multimedia device. The multimedia device includes a high-definition multimedia interface (HDMI) receiver, a first transfer circuit, and a first universal serial bus type C (USB-C) interface. The first transfer circuit is configured to transfer a first audio signal output by an audio channel pin of the HDMI receiver into a second audio signal in a universal serial bus (USB) interface format. The first USB-C interface is configured to transmit the second audio signal. The HDMI audio channel pin is an audio return channel (ARC) pin or an enhanced ARC pin.

13 Claims, 4 Drawing Sheets

(56) References Cited

U.S. PATENT DOCUMENTS

| | | | |
|---|---|---|---|
| 2019/0082141 A1* | 3/2019 | Chen | H04N 7/104 |
| 2019/0373211 A1* | 12/2019 | Chen | H04N 5/268 |
| 2020/0019526 A1* | 1/2020 | Wentroble | G06F 13/4282 |
| 2020/0226087 A1* | 7/2020 | Sun | H04N 21/442 |
| 2021/0224216 A1* | 7/2021 | Huang | G06F 13/4282 |
| 2021/0311892 A1* | 10/2021 | Komori | G06F 1/08 |
| 2022/0179815 A1* | 6/2022 | Carino | G06F 13/4022 |

* cited by examiner

_(1)_
AUDIO AND VIDEO TRANSMISSION SYSTEM

CROSS-REFERENCE TO RELATED APPLICATIONS

This application claims the benefit of priority to Patent Application No. 202110362756.0, filed in China on Apr. 2, 2021, which is incorporated by reference in its entirety.

TECHNICAL FIELD

The present application relates to a transmission system; in particular, to an audio and video transmission system.

BACKGROUND

The popularity of the USB-C interface in audio and video transmission systems is increasing. In order to enhance the user experience, the USB-C interface is increasingly supported; for example, the USB-C interface has a display port alternate mode (DP ALT mode), which allows the USB-C interface to receive DP format audio and video data. Therefore, the need for USB-C interface support for other formats also becomes more important.

SUMMARY OF THE INVENTION

An aspect of the present disclosure provide an audio and video transmission system, which includes a high-definition multimedia interface (HDMI) receiver, a first conversion circuit, and a first universal serial bus type C (USB-C) interface. The first conversion circuit is configured to convert a first audio signal outputted by an audio channel pin of the HDMI receiver into a second audio signal in a universal serial bus (USB) interface format. The first universal serial bus type C (USB-C) interface is configured to transfer the second audio signal. The audio channel pin is an audio return channel (ARC) pin or an enhanced audio return channel (eARC) pin.

Another aspect of the present disclosure provide an audio and video transmission system, which includes a speaker and an audio video receiver (AVR). The AVR includes a first USB-C interface and a first conversion circuit. The USB-C interface is configured to receive a first audio signal in a USB interface format through a USB 2.0 pin of the first USB-C interface. The first conversion circuit is configured to converts the first audio signal into a second audio signal in a universal audio format, so that the speaker plays the second audio signal.

The audio and video transmission system of the present application uses the USB 2.0 pin in the USB-C interface to transmit the audio return signal outputted by the ARC pin or eARC pin of HDMI so that the USB-C interface of the present audio and video transmission system supports the audio return function of HDMI.

BRIEF DESCRIPTION OF THE DRAWINGS

Aspects of the present disclosure are best understood from the following detailed description when read with the accompanying drawings. It is noted that, in accordance with the standard practice in the industry, various features are not drawn to scale. In fact, the dimensions of some features may be arbitrarily increased or reduced for clarity of discussion.

DETAILED DESCRIPTION

Figure 1:
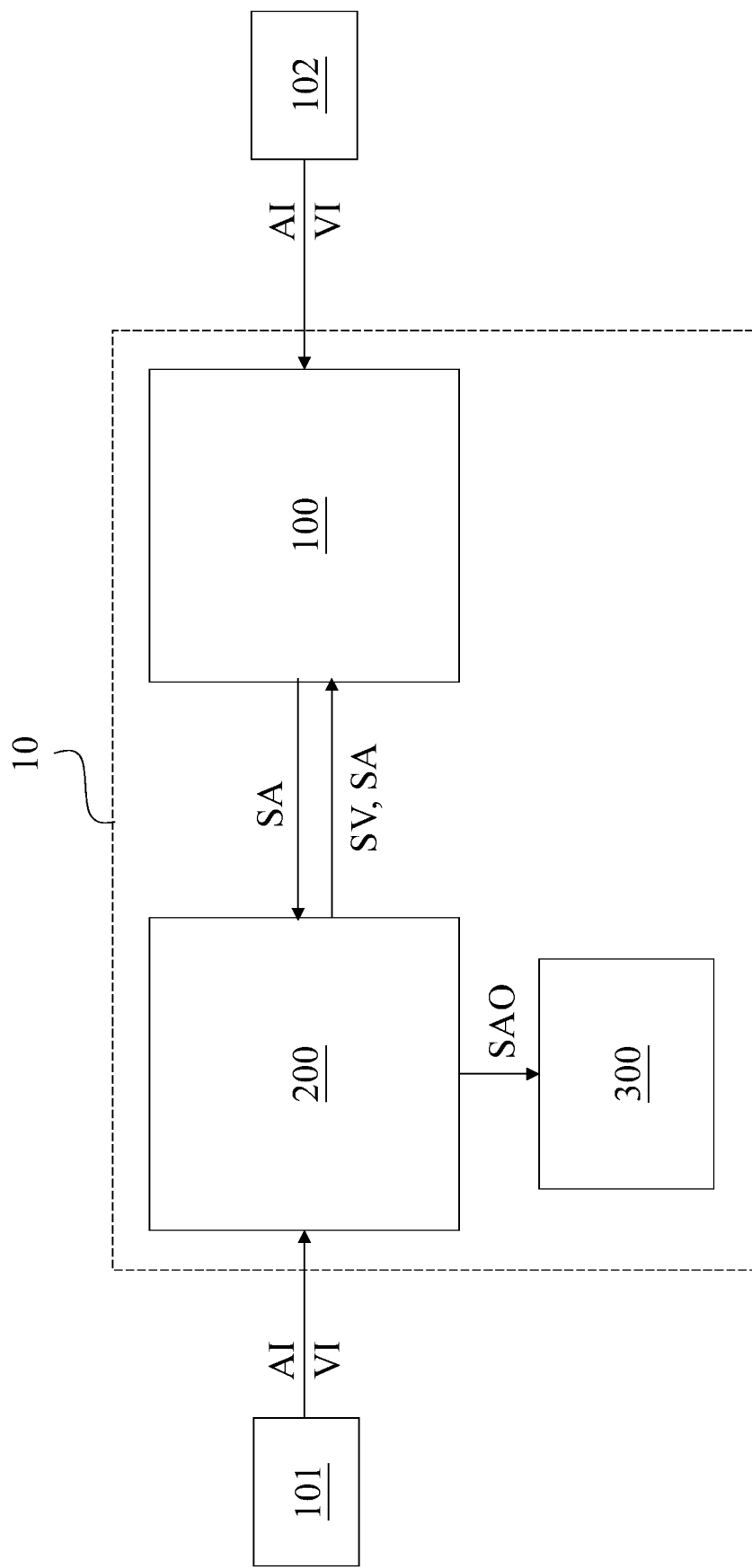
FIG. 1 is a schematic diagram illustrating an audio and video transmission system according to some embodiments of the present application.

FIG. 1 is a schematic diagram illustrating an audio and video transmission system 10 according to some embodiments of the present application. The audio and video transmission system 10 is configured to receive audio and video signals from an audio/video source 101 and/or an audio/video source 102, and play the video and/or audio according to the video source signal VI and the audio source signal AI in the audio and video signal, wherein the video source signal VI and the audio source signal AI are synchronized with each other.

In some embodiments, the audio and video transmission system 10 includes a multimedia device 100, an audio video reviewer (AVR) 200, and a speaker 300; however, the present application is not limited thereto.

In some embodiments, the AVR 200 receives the audio and video signal from the audio/video source 101. The AVR 200 processes the audio and video signal to generate the video signal SV and the audio signal SA, and transfers the video signal SV and the audio signal SA to the multimedia device 100. The multimedia device 100 converts the video signal SV back into the video source signal VI and displays the video source signal VI. In some embodiments, the multimedia device 100 includes a high-definition multimedia interface (HDMI) receiver (such as the HDMI receiver 110 shown in FIG. 2). In the HDMI format, the multimedia device 100 can perform the audio return function on the AVR 200 in a single transmission line; that is, the multimedia device 100 returns the audio signal SA to the AVR 200. The AVR 200 further processes the audio signal SA as an audio signal SAO and transmits the audio signal SAO to the speaker 300. In this way, when the multimedia device 100 displays the video source signal VI, the speaker 300 is configured to play the audio signal SAO simultaneously so that the video and audio are played synchronously.

In some other embodiments, the multimedia device 100 receives the audio and video signal from the audio/video source 102. The multimedia device 100 displays the video source signal VI. The multimedia device 100 also processes the audio source signal AI as the audio signal SA using the audio return function in the HDMI format and transfers the audio signal SA to the AVR 200. The AVR 200 further processes the audio signal SA to generate the audio signal SAO and transfers the audio signal SAO to the speaker 300 so that the speaker 300 plays the audio signal SAO.

Figure 2:
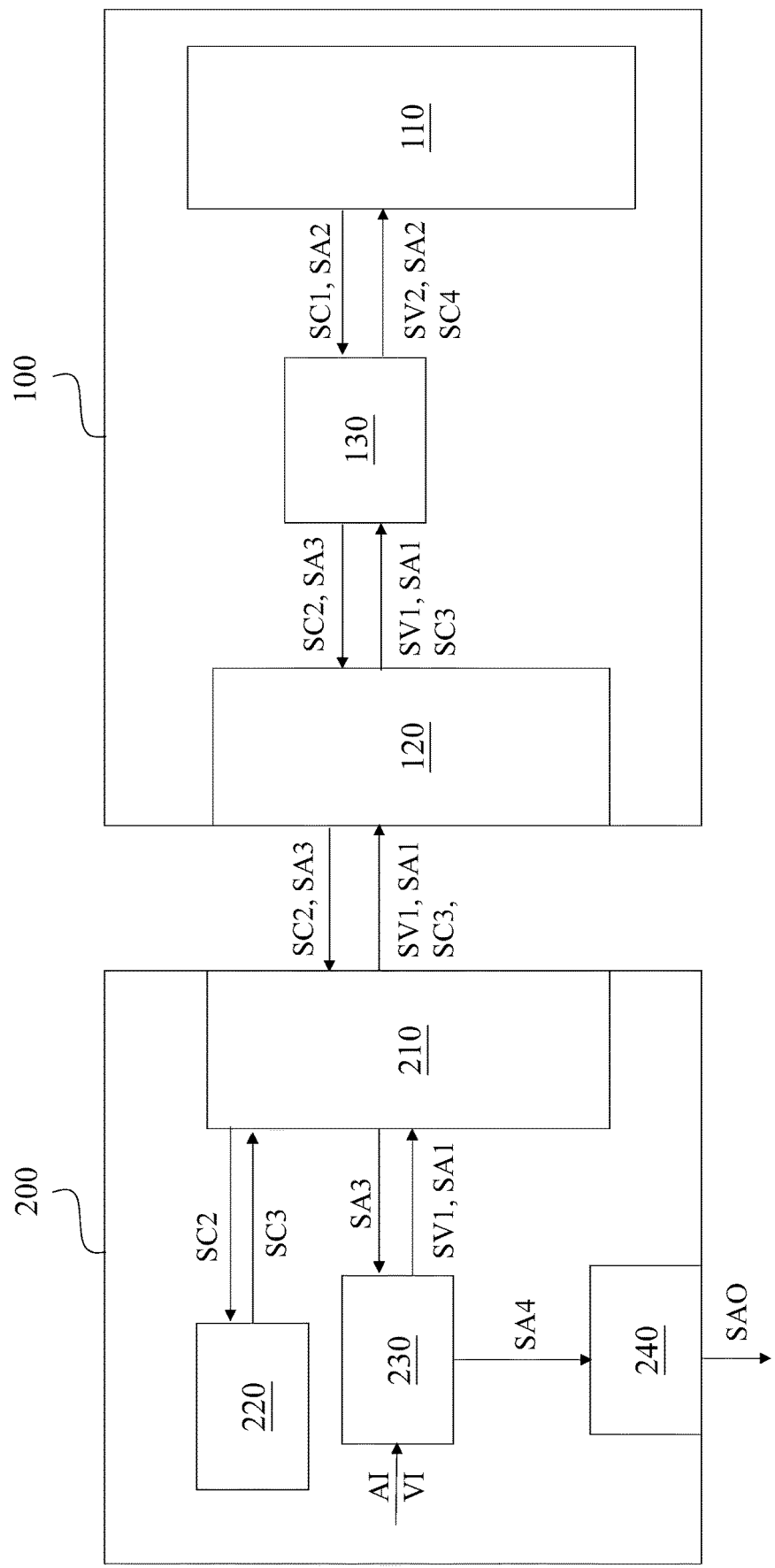
FIG. 2 is a schematic diagram illustrating a multimedia device and an audio video receiver (AVR) according to some embodiments of the present application.
Figure 4:
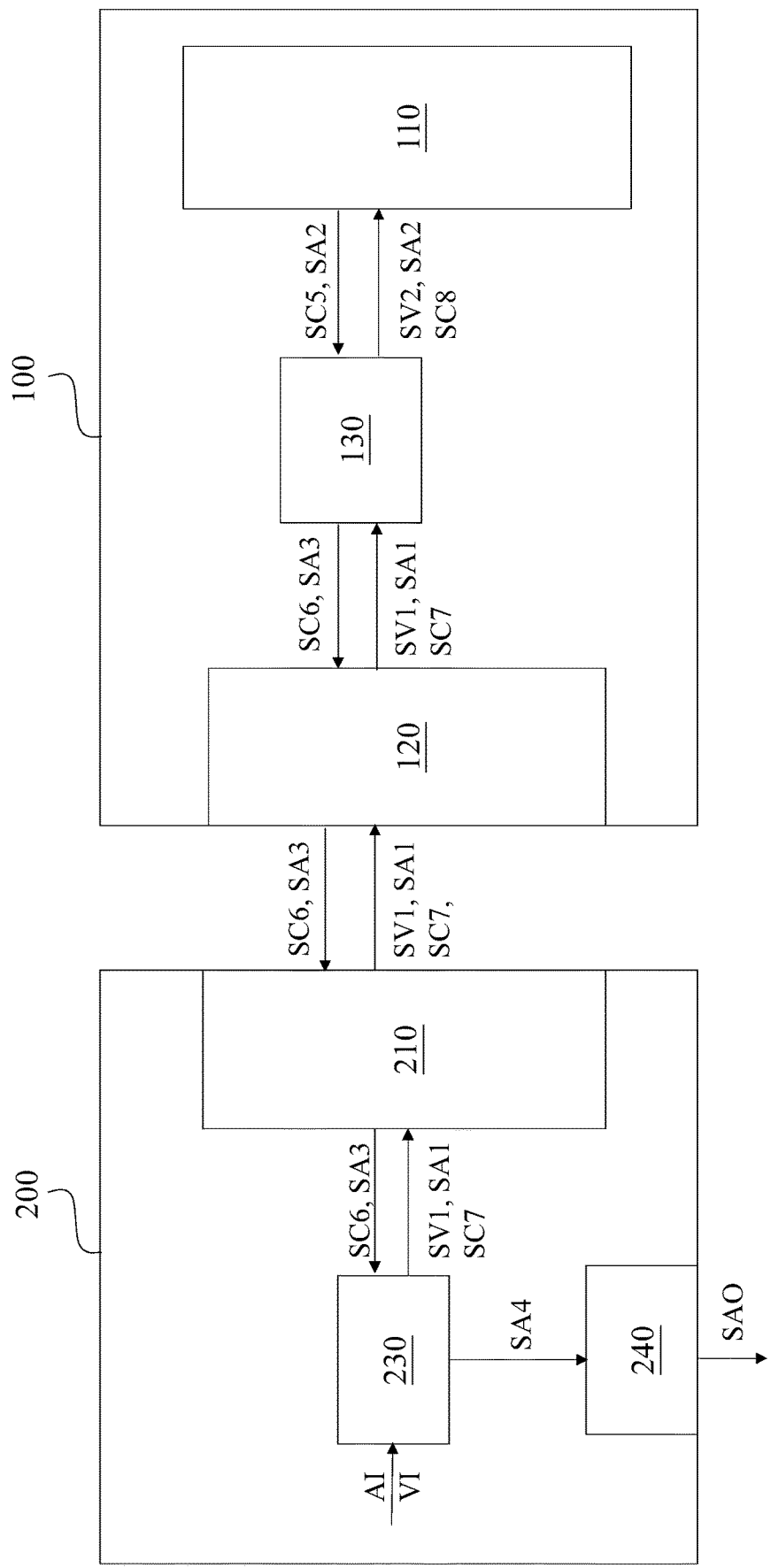
FIG. 4 is a schematic diagram illustrating a multimedia device and an AVR according to some other embodiments of the present application.

Embodiments of the multimedia device 100 are shown in FIG. 2 and FIG. 4, wherein the AVR 200 receives the audio and video signal from the audio/video source 101. As shown in FIG. 2, the multimedia device 100 includes an HDMI receiver 110, a USB-C interface 120, and a conversion circuit 130. The conversion circuit 130 is coupled between the USB-C interface 120 and the HDMI receiver 110. The AVR 200 includes a USB-C interface 210, a conversion circuit 220, a conversion circuit 230 and a conversion circuit 240. The USB-C interface 210 is coupled to the conversion circuit 220 and the conversion circuit 230, respectively. The conversion circuit 230 is further coupled to the conversion circuit 240.

The AVR 200 receives audio and video signals (including the video source signal VI and the audio source signal AI) through other interfaces (not shown in FIG. 2), such as HDMI, USB-C, or DP interface; however, the present application is not limited thereto, and the present application can also use other appropriate interfaces for receiving audio and video signals.

Figure 3:
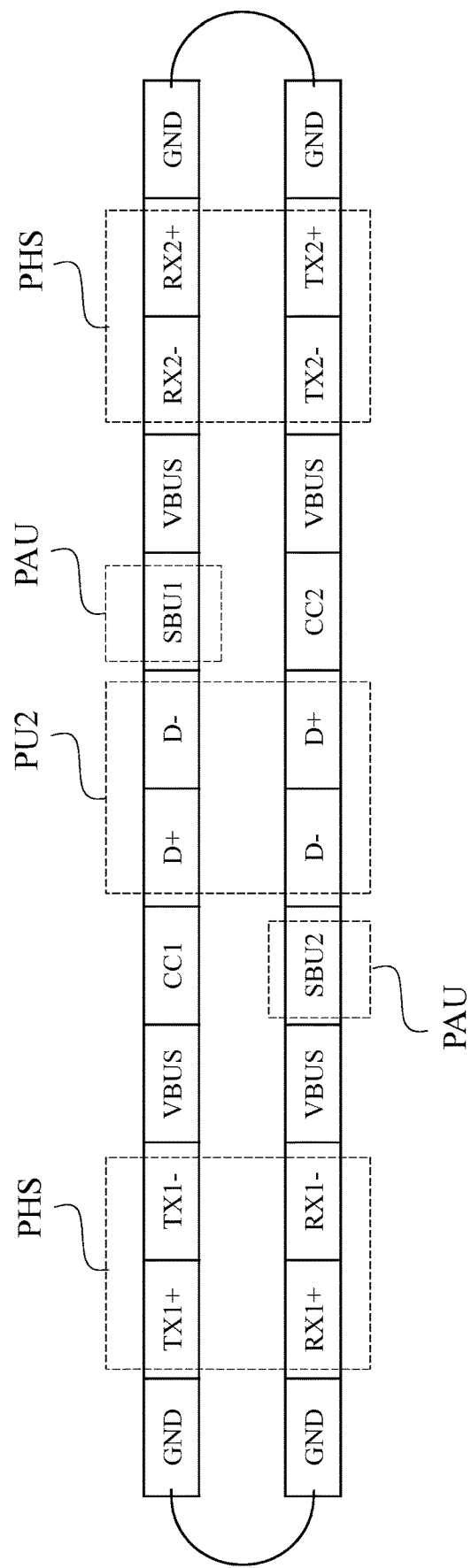
FIG. 3 is a schematic diagram illustrating a USB-C interface pin according to some embodiments of the present application.

As shown in FIG. 2, the conversion circuit 230 converts the video source signal VI and the audio source signal AI into a video signal SV1 and an audio signal SA1 in the DP interface format, and transfers the same to the USB-C interface 210. The USB-C interface 210 has a display port alternate (DP ALT) mode; therefore, the USB-C interface 210 may operate under the DP ALT mode and support the DP interface format signal transmission. The USB-C interface 210 uses a high-speed data path pin (such as the high-speed data path pin PHS shown in FIG. 3) in the USB-C interface 210 to transfer the video signal SV1 in the DP interface format and the audio signal SA1 in the DP interface format to the multimedia device 100, and then uses the USB-C interface 120 to receive the same. Reference is also made to the USB-C interface pin shown in FIG. 3. According to the definition of the USB-C specification, the USB-C interface has four pairs of high-speed data path pins, which are designated as TX1+, TX1−, RX1+, RX1−, TX2+, TX2−, RX2+, and RX2−. However, for ease of discussion, the present application uses the high-speed data path pin PHS to represent the four pairs of high-speed data path pins mentioned above.

The USB-C interface 120 in the multimedia device 100 also operates in the DP ALT mode. The high-speed data path pin PHS in the USB-C interface 120 is configured to receive the video signal SV1 and the audio signal SA1 and then transfer the video signal SV1 and the audio signal SA1 to the conversion circuit 130. The conversion circuit 130 is configured to converts the video signal SV1 and the audio signal SA1 in the DP interface format into the video signal SV2 and the audio signal SA2 in the HDMI format, and then transfers the video signal SV2 and the audio signal SA2 to the HDMI receiver 110. After the HDMI receiver 110 receives the video signal SV2 and the audio signal SA2, the multimedia device 100 displays the video signal SV2 through the display monitor (not shown in FIG. 2). In some embodiments, the video signal SV2 and the video source signal VI are identical in essence.

In some embodiments, the HDMI receiver 110 complies with the specification of HDMI 1.4, which uses a Utility pin to transfer the audio return channel (ARC) signal, thereby having the audio return function. In some other embodiments, the HDMI receiver 110 complies with the specification of HDMI 2.1, which uses a Utility pin and a hot plug detection (HPD) pin to transfer the enhanced audio return channel (eARC) signal, thereby having an enhanced audio return function. However, the present application is not limited thereto, and the HDMI receiver 110 may comply with specifications higher than HDMI 2.1 and be compatible with the HDMI 2.1 and HDMI 1.4 specifications.

To facilitate understanding, the multimedia device 100 and the AVR 200 shown in FIG. 2 are used to describe the example in which the HDMI receiver 110 complies with the HDMI 1.4 specification. The multimedia device 100 and the AVR 200 shown in FIG. 4 are used to describe the example in which the HDMI receiver 110 complies with the HDMI 2.1 specification. Related operations are discussed below.

In FIG. 2, the consumer electronics control (CEC) pin of the HDMI receiver 110 is configured to output the control signal SC1, wherein the control signal SC1 is a signal configured to obtain the audio format supported by the AVR 200, and request to initiate the audio return function of the AVR 200 and cease the audio return function of the AVR 200. After the conversion circuit 130 receives the control signal SC1, the control signal SC1 is converted to a control signal SC2 in the USB interface format, which is transferred to the USB-C interface 120. The USB-C interface 120 receives the control signal SC2 through a sideband use (SBU) (see, FIG. 3) pin PAU in the USB-C interface 120 and transfers the control signal SC2 to the USB-C interface 210 in the AVR 200. The USB-C interface 210 also receives the control signal SC2 through the SBU pin PAU in the USB-C interface 210 and transfers the same to the conversion circuit 220. The conversion circuit 220 is configured to decode the control signal SC2 to generate a control signal SC3, and return the control signal SC3 to the conversion circuit 130 through the USB-C interface 210 and the USB-C interface 120. The conversion circuit 130 is further configured to convert the control signal SC3 into a control signal SC4 in the HDMI format and transfer the control signal SC4 to the HDMI receiver 110 through the CEC pin wherein the control signal SC4 is a signal configured to reply to the HDMI receiver 110 regarding the audio formats supported by the AVR 200 or to request to initiate or cease the audio return function.

After the HDMI receiver 110 receives the control signal SC4, the HDMI receiver 110 uses the ARC pin of the HDMI receiver 110 to output the audio signal SA2 to the conversion circuit 130. The conversion circuit 130 is configured to convert the audio signal SA2 into an audio signal SA3 in the USB interface format and transfer the audio signal SA3 to the USB-C interface 120. The USB-C interface 120 uses the USB 2.0 pin PU2 in the USB-C interface 120 to receive the audio signal SA3 and transfers the audio signal SA3 to the USB-C interface 210. The USB-C interface 210 also receives the audio signal SA3 through the USB 2.0 pin PU2 in the USB-C interface 210 and transfers the audio signal SA3 to the conversion circuit 230. The conversion circuit 230 is further configured to convert the audio signal SA3 into an audio signal SA4 (maybe comply with some specific audio formats, such as SPDIF under HDMI or USB, optionally) and transfer the same to the conversion circuit 240. In some embodiments, the audio signal SA4 and the audio signal SA2 are identical in essence. The conversion circuit 240 is configured to convert the audio signal SA4 into the audio signal SAO and transfer the audio signal SAO to the speaker 300, so that the speaker 300 plays the audio signal SAO. In some embodiments, the conversion circuit 240 includes a digital-to-analog converter (not shown in the drawings), which is configured to convert the digital audio signal SA4 into an analog audio signal SAO. In some other embodiments, the conversion circuit 230 is configured to convert the audio signal SA3 into the audio signal SA4 in the universal audio format, and then the conversion circuit 240 converts the audio signal SA4 to generate the audio signal SAO and transfers the audio signal SAO to the speaker 300.

According to definition of the USB-C specification, the USB-C interface has a pair of sideband use pins, which are, respectively, SBU1 and SBU2. However, in the present disclosure, the SBU pin PAU is used to represent said pair of sideband use pins for ease of discussion.

In some embodiments, the speaker 300 can play the audio signal SA4 directly. In other words, the AVR 200 does not include the conversion circuit 240.

Reference is made to FIG. 4. In the embodiment where the HDMI receiver 110 complies with the HDMI 2.1 specification, the HDMI receiver 110 outputs a control signal SC5 through the eARC pin using a common mode data channel (CMDC), wherein the control signal SC5 is a signal configured to request the AVR 200 to initiate the audio return function, obtain the audio format supported by the AVR 200, and process an audio latency. After the conversion circuit 130 receives the control signal SC5, the conversion circuit 130 converts the signal SC5 into a control signal SC6 in the USB2.0 format and transfers the same to the USB-C interface 120. The USB-C interface 120 receives the control signal SC6 through the USB2.0 pin PU2 in the USB-C interface 120 and uses the control transfer defined by the USB 2.0 to transfer the control signal SC6 to the USB-C interface 210 of the AVR 200. The USB-C interface 210 also receives the control signal SC6 through the USB2.0 pin PU2 in the USB-C interface 210 and transfers the same to the conversion circuit 230. The conversion circuit 230 is configured to decode the control signal SC6 to generate a control signal SC7 and return the control signal SC7 to the conversion circuit 130 through the USB-C interface 210 and the USB-C interface 120. The conversion circuit 130 is further configured to convert the control signal SC7 into a control signal SC8 in the HDMI format and transfer the same to the HDMI receiver 110, wherein the control signal SC8 is a signal configured to notify the HDMI receiver 110 to initiate the audio return function, reply to the AVR 200 about the supported audio format and audio latency.

After the HDMI receiver 110 receives the control signal SC8, the HDMI receiver 110 outputs the audio signal SA2 to the conversion circuit 130 through the eARC pin of the HDMI receiver 110 using a differential mode audio channel (differential mode audio channel, DMAC). The conversion circuit 130 is configured to convert the audio signal SA2 into the audio signal SA3 in the USB2.0 format and transfer the same to the USB-C interface 120. The USB-C interface 120 receives the audio signal SA3 through the USB 2.0 pin PU2 in the USB-C interface 120 and uses the Isochronous Transfer defined by the USB 2.0 to transfer the audio signal SA3 to the USB-C interface 210. The USB-C interface 210 also receives the audio signal SA3 through USB 2.0 pin PU2 defined in the USB-C interface 210 and transfers the audio signal SA3 to the conversion circuit 230. The conversion circuit 230 is further configured to convert the audio signal SA3 into the audio signal SA4 in the universal audio format and transfer the same to the conversion circuit 240. The conversion circuit 240 is configured to convert the audio signal SA4 into the audio signal SAO and transfers the same to the speaker 300, so that the speaker 300 plays the audio signal SAO. In some other embodiments, the conversion circuit 230 is configured to convert the audio signal SA3 into the HDMI format and transfer the same to the conversion circuit 240.

In some embodiments, the conversion circuit 230 is used to obtain the time delay currently expected by the multimedia device 100 between displaying the video signal SV2 and receiving the audio signal SA3 according to the control signal SC6, based on the control transfer defined by USB 2.0, and the conversion circuit 230 delays the audio signal SA3 based on said time delay to generate the audio signal SA4 and then transmits the currently actual time delay of the AVR 200 back to the multimedia device 100 using a control signal SC7. In this way, the conversion circuit 230 can be used to control the time that the speaker 300 plays the audio signal SAO so that the audio signal SAO and the video signal SV2 can be displayed synchronously.

Compared to the embodiment shown in FIG. 2, the AVR 200 of FIG. 4 does not include the conversion circuit 220. Specifically, when executing the enhanced audio return function of the HDMI 2.1 specification, the control signal SC5 and the audio signal SA2 are both outputted by the eARC pin. Therefore, the USB-C interface 120 can only use the USB 2.0 pin PU2 to receive the corresponding control signal SC6 and audio signal SA3. Similarly, the USB-C interface 210 can only use the USB 2.0 pin PU2 to receive and transfer the control signal SC6 and the audio signal SA3 to the conversion circuit 230. When executing the audio return function of HDMI 1.4 specification, the control signal SC1 and the audio signal SA2 are respectively outputted by the CEC pin and ARC pin. The USB-C interface 120 respectively uses the SBU pin PAU and USB 2.0 pin PU2 to receive the corresponding control signal SC2 and audio signal SA3. Similarly, the USB-C interface 210 also uses the SBU pin PAU and USB 2.0 pin PU2 to respectively receive and transfer the control signal SC2 and the audio signal SA3 to the conversion circuit 220 and the conversion circuit 230. Thus, the AVR 200 in FIG. 2 includes the conversion circuit 220.

The present application uses the USB-C interface to transfer data between the multimedia device 100 and the AVR 200, thereby enhancing the convenience and compatibility. Meanwhile, the embodiments provided by the present application can perform audio return function without additional cable, i.e., no additional cost.

What is claimed is:

1. An audio and video transmission system, comprising:
a high-definition multimedia interface (HDMI) receiver;
a first conversion circuit, configured to convert a first audio signal in a HDMI format outputted by an audio channel pin of the HDMI receiver into a second audio signal in a universal serial bus (USB) interface format; and
a first universal serial bus type C (USB-C) interface, configured to transfer the second audio signal in a display port alternate mode (DP ALT mode),
wherein the audio channel pin is an enhanced audio return channel (eARC) pin,
wherein the first USB-C interface transfers the second audio signal through a USB 2.0 pin of the first USB-C interface, and
wherein the first conversion circuit is further configured to converts a third control signal transmitted from the eARC pin of the HDMI receiver into a fourth control signal in the USB interface format.

2. The audio and video transmission system of claim 1, wherein the first USB-C interface transfers the second audio signal based on a control transfer of USB 2.0 definition.

3. The audio and video transmission system of claim 1, wherein the first USB-C interface transfers the fourth control signal and the second audio signal through a USB 2.0 pin of the first USB-C interface.

4. The audio and video transmission system of claim 3, wherein the HDMI receiver outputs the third control signal using a common mode data channel (CMDC).

5. The audio and video transmission system of claim 3, wherein the HDMI receiver outputs the first audio signal using a differential mode audio channel (DMAC).

6. The audio and video transmission system of claim 1, further comprising a multimedia device including the HDMI receiver, the first conversion circuit, and the first USB-C interface, wherein the multimedia device is configured to receive a video source signal and an audio source signal that are synchronized with each other, and the multimedia device is further configured to display the video source signal, wherein the first audio signal and the audio source signal are identical, wherein the audio and video transmission system further comprises:
a speaker; and
an audio video receiver (AVR), comprising:
   a second USB-C interface, configured to receive the second audio signal; and
   a second conversion circuit, configured to convert the second audio signal into a third audio signal and transfers the third audio signal to the speaker, so that the speaker plays the third audio signal simultaneously when the multimedia device displays the video source signal.

7. An audio and video transmission system, comprising:
a speaker; and
an audio video receiver (AVR), comprising:
   a first universal serial bus type C (USB-C) interface, operating in a display port alternate mode (DP ALT mode), configured to receive a first audio signal in a universal serial bus (USB) interface format through a USB 2.0 pin of the first USB-C interface; and
   a first conversion circuit, configured to convert the first audio signal into a second audio signal in a universal audio format, so that the speaker plays the second audio signal,
wherein the AVR is configured to receive a video source signal and an audio source signal that are synchronized with each other and comply with a HDMI format, wherein the first conversion circuit is configured to respectively convert the video source signal and the audio source signal into a DP video source signal and a DP audio source signal in the DP interface format and transfer the same through a high-speed data path pin of the first USB-C interface,
wherein the audio and video transmission system further comprises:
a multimedia device, configured to receive the DP video source signal and the DP audio source signal and configured to display the video source signal, wherein the multimedia device comprises:
   a second USB-C interface, configured to receive the DP video source signal and the DP audio source signal through a the high-speed data path pin of the second USB-C interface;
   a second conversion circuit, configured to convert the DP video source signal and the DP audio source signal back into the video source signal and the audio source signal complying with the HDMI format; and
   a HDMI receiver, configured to receive the video source signal and the audio source signal from the second conversion circuit and output an audio return signal to the second conversion circuit, wherein the audio source signal and the audio return signal are identical,
wherein the second conversion circuit is further configured to convert the audio return signal into the first audio signal in the USB interface format.

8. The audio and video transmission system of claim 7, wherein the second USB-C interface operates in the DP ALT mode.

9. The audio and video transmission system of claim 7, wherein an audio return channel (ARC) pin of the HDMI receiver is configured to output the audio return signal, and a consumer electronics control (CEC) pin of the HDMI receiver is configured to output a first control signal, wherein the second conversion circuit is further configured to convert the first control signal into a second control signal in the USB interface format, wherein the second USB-C interface is further configured to transfer the second control signal to the first USB-C interface through a sideband use (SBU) pin, wherein the AVR further comprises:
   a third conversion circuit, configured to convert the second control signal into a third control signal in the HDMI format and decode the third control signal.

10. The audio and video transmission system of claim 9, wherein a USB 2.0 pin of the second USB-C interface is configured to transfer the first audio signal, and a USB 2.0 pin of the first USB-C interface is configured to receive the first audio signal.

11. The audio and video transmission system of claim 7, wherein an enhanced audio return channel (eARC) pin of the HDMI receiver is configured to output a fourth control signal and the audio return signal, wherein the second conversion circuit is further configured to convert the fourth control signal into a fifth control signal in the USB interface format, wherein a USB 2.0 pin of the first USB-C interface is configured to receive the fifth control signal and the first audio signal.

12. The audio and video transmission system of claim 11, wherein the HDMI receiver outputs the fourth control signal using a common mode data channel (CMDC).

13. The audio and video transmission system of claim 11, wherein the HDMI receiver outputs the audio return signal using a differential mode audio channel (DMAC).

* * * * *